No. 720,313. PATENTED FEB. 10, 1903.
R. H. BENNER.
SAW.
APPLICATION FILED JUNE 27, 1902.
NO MODEL.

Witnesses
Inventor
Reuben H. Benner,
by John Elias Jones,
his attorney.

UNITED STATES PATENT OFFICE.

REUBEN H. BENNER, OF CINCINNATI, OHIO.

SAW.

SPECIFICATION forming part of Letters Patent No. 720,313, dated February 10, 1903.

Application filed June 27, 1902. Serial No. 113,543. (No model.)

*To all whom it may concern:*

Be it known that I, REUBEN H. BENNER, a citizen of the United States of America, and a resident of Cincinnati, in the county of Hamilton and State of Ohio, have invented certain new and useful Improvements in Saws, of which the following is a specification.

This invention relates to certain improvements in saws, and particularly to the saws of circular sawing machines, and has for its object to provide a saw of an improved and simple construction by means of which the thinner and toothed edge portion of the saw is strengthened and protected against lateral or side strains, so that the saw is caused to produce a straight kerf and bending or cracking of the saw is prevented.

The invention consists in certain novel features of the construction, combination, and arrangement of the several parts of the improved saw, whereby certain important advantages are attained and the device is made simpler, cheaper, and otherwise better adapted and more convenient for use than various other forms of circular saw heretofore devised, all as will be hereinafter fully set forth.

The novel features of the invention will be carefully defined in the claims.

In order that my improvements may be the better understood, I have illustrated in the accompanying drawings a segmental circular saw constructed according to my invention, in which drawings—

Figure 1:
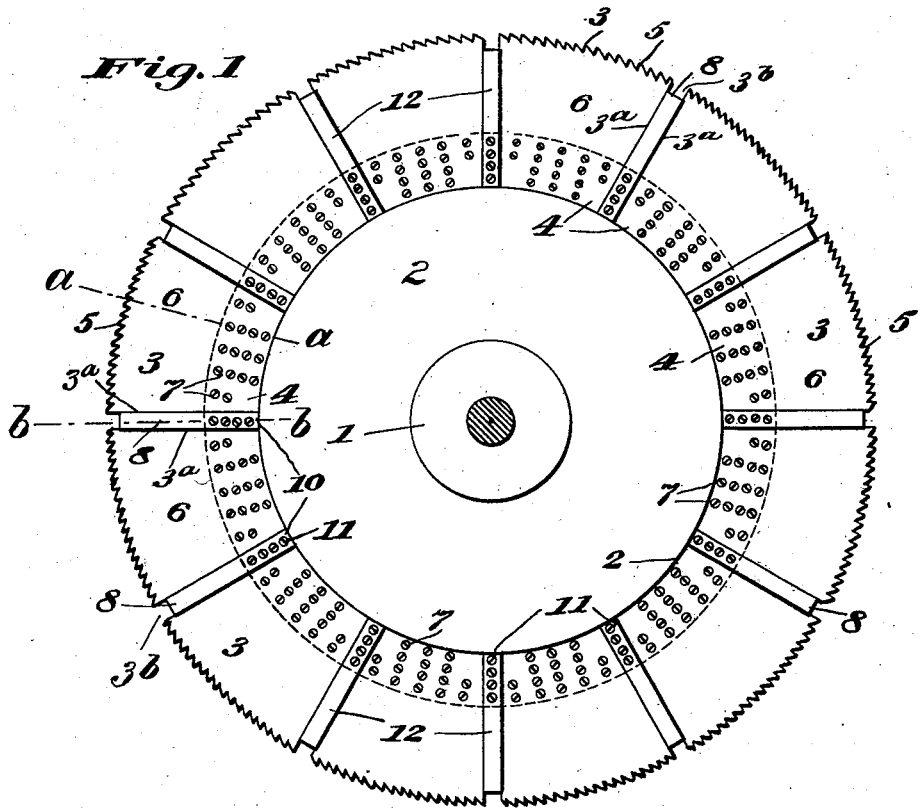
Figure 2:
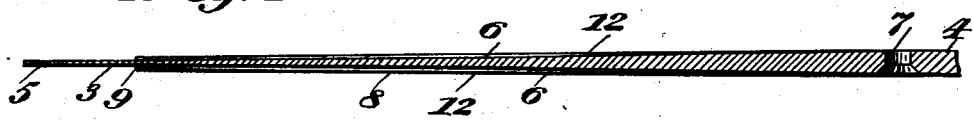
Figure 3:
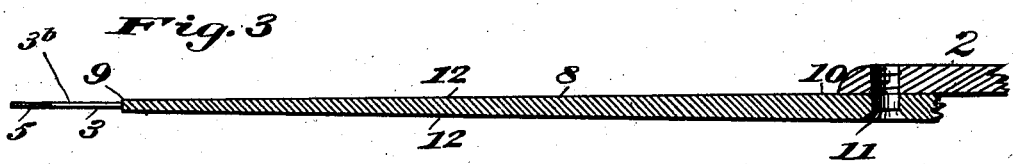

Figure 1 is a side elevation of the saw, showing the improvements applied thereto; and Fig. 2 is a sectional view drawn to an enlarged scale and taken through one edge portion of the saw in the plane indicated by the dotted line $a\ a$ in Fig. 1. Fig. 3 is a sectional view similar to Fig. 2, but taken through the edge portion of the saw in the plane indicated by the dotted line $b\ b$ in Fig. 1.

As shown in the views, the saw to which my improvements are applied is of the segmental circular type and is constructed with a central collar or hub 1, adapted to be secured upon a saw shaft or arbor in any ordinary way, and provided with an annular projection or flange 2, extended around its edge portion and gradually reduced in thickness from said central hub or collar 1 toward its outer edge. The edge portion of the flange or projection 2 is provided upon one face of the saw with an annular recess extended around it and adapted to receive the inner thickened end portions 4 4 of a series of segments 3 3, the outer edges of which are curved concentrically with the saw shaft or arbor and are provided with teeth or serrations 5 5, whereof the cutting edge of the saw is formed.

The inner thickened end portions of the toothed segments 3 3 are formed with openings 7 7 for the passage of screws whereby said segments are securely held upon the flange 2 of the hub or collar 1 of the saw with their toothed edges projecting beyond said flange, and said toothed edge portions 5 of the segments 3 are made of less thickness than the inner thickened end portions of the segments, the said segments being made gradually increasing in thickness from their outer toothed edge portions 5 toward their inner thickened portions 4, as indicated in Fig. 2 of the drawings. The opposite side surfaces of the segments 3 between the thinner outer edge portions 5 and the thicker inner portions 4 are commonly made concaved, as indicated at 6 6 on the drawings.

The segments 3 have opposite edge portions $3^a\ 3^a$, which are extended in directions parallel with radii of the saw, and in the attachment of the segments to the flange 2 of the hub or collar 1 the said edges $3^a\ 3^a$ of each two adjacent segments are spaced apart, so as to produce between them an opening $3^b$, also extended radially of the saw, in which opening is arranged a reinforcing part or piece 8, one end portion 10 of which is made of a thickness equal to that of the thickened inner portions 4 of the segments and is, similarly to said portions of the segments, provided with openings 11 for the passage of screws whereby the reinforcing part or piece 8 is held securely upon the recessed edge portion of the flange 2 of the hub of the saw. As shown in Fig. 1, there is such a reinforcing part or piece 8 arranged between the adjacent edges of each two adjacent segments 3 of the saw.

The length of the radially-extended reinforcing pieces or parts 8 is less than the width, measured radially upon the saw, of the toothed segments 3 3, so that the outer ends 9 of said reinforcing pieces or parts are located inside of the toothed outer edge portions 5 of the segments, and said outer ends of the reinforcing pieces or parts 8 are made of a thickness greater than the thickness of the portions of the segments 3 between which they are arranged, so that the opposite sides of the reinforcing pieces or parts are caused to project outside of and beyond the opposite side surfaces of the segments, as shown in Figs. 2 and 3. The said outer ends 9 of the reinforcing pieces or parts 8 are, however, made of a thickness less than that of their inner end portions 10, and the side surfaces of the parts or pieces 8 between said outer and inner end portions 9 and 10 are made tapered, so as to give to the reinforcing pieces or parts a general wedge shape in cross-section. The side surfaces 12 of the reinforcing pieces or parts are preferably made plane, and by reason of the concavities of the sides of the segments said side portions 12 of the parts or pieces 8 are caused to protrude from the concave side surfaces of the segments at substantially all points between the outer and inner end portions 9 and 10 of the pieces or parts 8, as clearly shown in Fig. 2. The thickness of the outer end portions 9 of the reinforcing pieces or parts will preferably be but slightly greater than the thickness of the portions of the segments between which said pieces or parts are held, so that at said outer ends the side portions of the said parts or pieces will protrude but little beyond the sides of the segments, and consequently will offer but little resistance to the passage of the saw through the wood.

In the operation of the saw constructed according to my invention as the thinner toothed edge portion of the saw passes through the wood in sawing the outer ends of the wedge-shaped reinforcing pieces or parts 8 will be inserted in the kerf cut by said toothed edge portion and will act in the manner of wedges to force or spread the kerf open and permit the teeth of the saw to clear, so that a very considerable part of the stress which would otherwise be borne by the thinner outer portion of the saw is relieved and is carried by the thicker, and consequently stronger, wedge-shaped reinforcing parts or pieces, whereby cracking or other damage to the segments is prevented and the cost of maintaining and repairing the saw is considerably lessened.

As the thin edge portion of the saw is capable of being very easily bent or deflected laterally or sidewise in cutting, it is evident also that it will be materially strengthened and stiffened by the insertion of the reinforcing pieces or parts between the segments, so that it is enabled to withstand side strains such as are caused by lateral movements of the material being sawed, and in this way the sawed material is produced in even and uniform thickness from end to end and is not liable to vary in thickness, as is the case where no such stiffening means are provided. This strengthening or stiffening of the saw also serves to materially lessen the liability to damage or bending of the saw caused by such lateral movement of the materials being sawed and in this way also tends to lessen the cost of repairs. By reason also of the stiffening or strengthening of the thinner edge portions of the saw by means of the inserted reinforcing devices it will be evident that the outer cutting edges of the saw may be made in a thickness less than is necessary in other constructions, so that the kerf taken out by the saw is lessened and the allowance for cut is reduced, whereby a considerable saving in material is effected.

From the above description of my improvements it will be seen that the saw constructed in accordance with my invention is of an extremely simple and inexpensive nature and is especially well adapted for the purposes for which it is designed, and it will also be evident from the above description that the device is capable of some modification without material departure from the principles and spirit of the invention, and for this reason I do not wish to be understood as limiting myself to the precise form and arrangement of the several parts of the device as herein set forth.

Having thus described my invention, what I claim, and desire to secure by Letters Patent, is—

1. A saw having its blade provided with transversely-extended reinforcing parts or pieces extended beyond the side surfaces of the saw and adapted for contact with the material being sawed to relieve strains upon the blade, substantially as set forth.

2. A saw having its blade provided with transversely-extended reinforcing parts or pieces the opposite side portions of which are extended beyond the side surfaces of the saw and are adapted for contact with materials being sawed to relieve strains upon the blade, substantially as set forth.

3. A saw having its blade provided with transversely-extended reinforcing parts or pieces of wedge shape in cross-section, the opposite side portions of said parts or pieces being extended beyond the side surfaces of the saw and being adapted for contact with materials being sawed to relieve strains upon the saw, substantially as set forth.

4. A saw having openings produced in it and provided with reinforcing parts or pieces arranged in said openings with side portions extended out beyond the side surfaces of the saw and adapted for contact with materials being sawed to relieve strains upon the blade, substantially as set forth.

5. A saw having openings produced in it and provided with reinforcing parts or pieces arranged in said openings and made in wedge shape with inclined side portions extended out from said openings and beyond the side surfaces of the saw for engagement with materials being sawed to relieve strains upon the blade, substantially as set forth.

6. In a saw, the combination of a flanged hub or collar, toothed segments held upon the outer edge portions of said flanged hub or collar with side portions spaced apart to produce openings between them and wedge-shaped reinforcing parts or pieces held on said flanged hub or collar and extended in the openings between the segments and having inclined side portions extended out from the openings and beyond the side surfaces of the segments in position for engagement with materials being sawed to relieve strains upon the segments, substantially as set forth.

Signed at Cincinnati, Ohio, this 23d day of June, 1902.

REUBEN H. BENNER.

Witnesses:
JOHN ELIAS JONES,
L. M. JONES.